United States Patent [19]

Fujimoto et al.

[11] Patent Number: 4,488,430

[45] Date of Patent: Dec. 18, 1984

[54] TIRE INSPECTING APPARATUS

[75] Inventors: Mitsuru Fujimoto; Yoshiharu Shima; Hironobu Motooka, all of Shirakawa; Minoru Kikuchi, Fukushima, all of Japan

[73] Assignee: Sumitomo Rubber Industries, Ltd., Hyogo, Japan

[21] Appl. No.: 393,342

[22] Filed: Jun. 29, 1982

[30] Foreign Application Priority Data

Jun. 30, 1981 [JP] Japan ............................... 56-103610

[51] Int. Cl.$^{3}$ ............................................ G01M 17/02

[52] U.S. Cl. ...................................................... 73/146

[58] Field of Search .......................................... 73/146

[56] References Cited

U.S. PATENT DOCUMENTS 3,698,233 10/1972 Braden et al. .......................... 73/146
4,004,693 1/1977 Tsuji et al. ............................ 73/146
4,258,567 3/1981 Fisher ................................... 73/146
4,311,044 1/1982 Marshall et al. ...................... 73/146

FOREIGN PATENT DOCUMENTS 2916882 11/1980 Fed. Rep. of Germany ........ 73/146

*Primary Examiner*—Donald O. Woodiel
*Attorney, Agent, or Firm*—Birch, Stewart, Kolasch & Birch

[57] ABSTRACT

A tire inspecting apparatus for automatically detecting the presence of at least one excessive indent or defect on one or both side walls of the tire comprises supply inspection and delivery conveyors arranged in line with each other. The apparatus includes contact detectors adapted to contact the side walls of the tire and to detect the presence of the excessive indent on the side wall of the tire while the tire in an inflated condition is rotated relative to the contact detectors at a position above the inspection conveyor. These contact detectors generate an electrical signal indicative of the presence of the excessive tire.

4 Claims, 6 Drawing Figures

TIRE INSPECTING APPARATUS

The present invention relates to a tire inspecting apparatus for automatically detecting the presence of a defect on the side wall of a tire during the manufacture of the tire.

As is well known to those skilled in the art, that during the manufacture of a tire, a web of cord fabric is, cut into a plurality of fabric pieces after having been coated with rubber by a calendering roll assembly, to provide respective carcass strips of a predetermined width. These carcass strips are then joined end to end in an overlapping relation to provide a continuous band of carcass strips which is, in turn, rolled to form a generally ring-shaped carcass structure. The carcass structure so formed is fabricated together with a rubber band and bead wires during the tire shaping process to produce a green tire which, when passed through a vulcanizing process, becomes a vulcanized tire ready for use.

During the formation of the continuous band of the carcass strips in the manner described above, the overlapping joints between each of the neighboring carcass strips form indents which, tend to show up in the manufactured tire, such as a tire having a monoply carcass structure, as extending generally radially in both side walls. Should one or more of these indents be excessive, i.e., one or more of these indents protrude outwardly from the corresponding side wall or side walls beyond the design tolerance (for example, 0.5 mm) to such an extent as to be salient, the tire is generally considered defective in appearance thus, having little commercial value.

Heretofore, detection of the presence of such excessive indents in the tires manufactured has been carried out manually and is, therefore, inefficient, time-consuming and inaccurate.

The present invention has, accordingly, been developed with a view to substantially eliminating the disadvantages and inconveniences associated with the manual intervention in carrying out the tire inspection and has for its essential object to provide an apparatus effective to automatically detect the presence of projecting indents in one or both side walls of a tire during the manufacture of such tire.

According to a preferred embodiment of the present invention, there is provided an automatic tire inspecting apparatus comprising a supply conveyor, a delivery conveyor in line with the supply conveyor, an intermediate inspection conveyor positioned between and in line with the supply and delivery conveyors, a centering mechanism for centering the tire on the inspection conveyor, upper and lower rim mechanisms for lifting the tire so centered and for inflating the tire while lifted, and contact and measuring rollers mounted on an arm supported for pivotal movement in a plane and also for movement in a direction perpendicular to such plane.

The apparatus of the present invention is effective to automatically detect the presence of one or more excessive indents in one or both side walls of the tire, accurately and efficiently without substantially requiring manual intervention.

These and other objects and features of the present invention will become clearly understood from the following detailed description taken in conjunction with a preferred embodiment thereof reference by the accompanying drawings, in which.

Before the description of the present invention proceeds, it is to be noted that like parts are designated by like reference numerals throughout the accompanying drawings.

Figure 1:
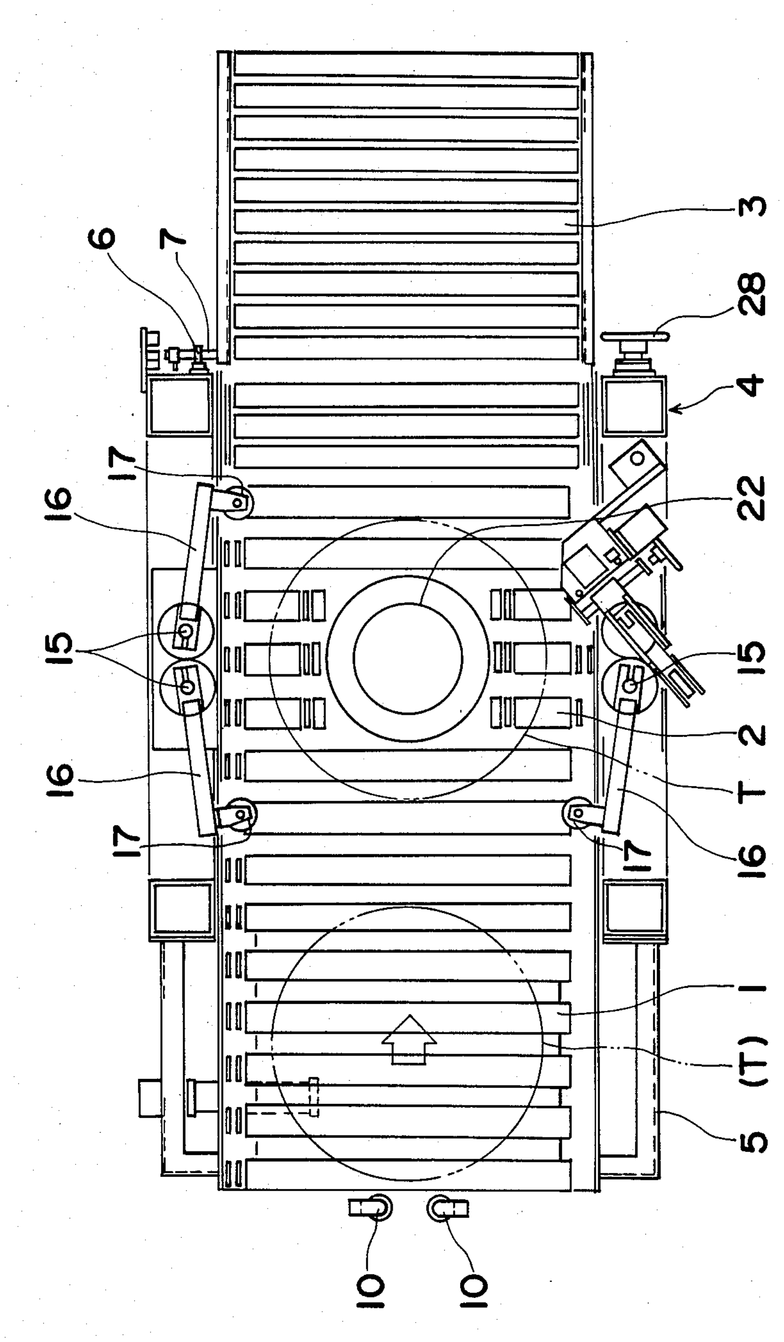
FIG. 1 is a top plan view of a tire inspecting apparatus according to the present invention.
Figure 2:
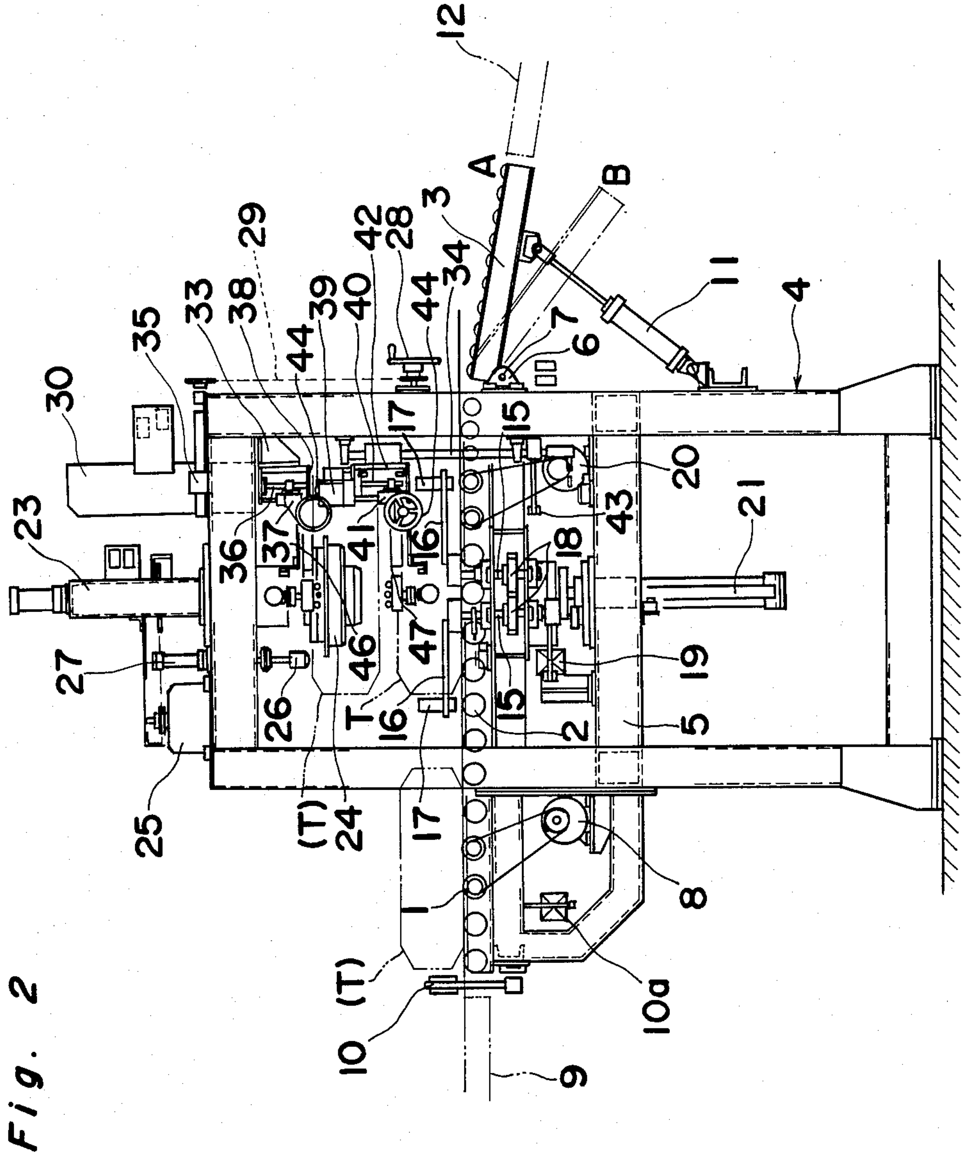
FIG. 2 is a front elevational view of the apparatus shown in FIG. 1, on a reduced scale.

Referring first to FIGS. 1 and 2, the tire inspecting apparatus for automatically detecting the presence of at least one projecting indent on either or both side walls of a tire T comprises a supply conveyor 1, an inspection conveyor 2 and a delivery conveyor 3, all arranged in line with each other with the inspection conveyor 2 positioned between the supply and delivery conveyors 1 and 3. The supply conveyor 1 is supported on a horizontal framework 5 carried by a frame structure 4 for the support of the inspection conveyor 2, whereas the delivery conveyor 3 is supported by a hinge shaft 7 to the frame structure 4 for pivotal movement between delivery and eject positions in a plane perpendicular to the floor.

The supply conveyor 1 is driven by a motor 8. Positioned between a conveyor 9 and the supply conveyor 1 is a movable stopper assembly 10 adapted to be driven by a cylinder 10*a* between a projected position, in which transportation of tires to be inspected from the conveyor 9 onto the supply conveyor 1 is interrupted, and a retracted position in which the tires are allowed to be transported one by one from the conveyor 9 onto the supply conveyor 1. This stopper assembly 10 serves to load the tires on the inspection conveyor 2 one at a time.

For angularly moving the delivery conveyor 3 between the delivery and eject positions which are respectively shown by the solid and phantom lines A and B in FIG. 2, a cylinder 11 is coupled to the delivery conveyor 3 to move the latter about the hinge shaft 7. The tire can be either transferred from the delivery conveyor 3 onto a subsequent conveyor 12 when it has been determined having no defect and also when the conveyor 3 is in the delivery position A, or ejected onto a collecting basket (not shown) when it has been determined to have a defect and when the conveyor 3 is accordingly moved to the eject position B.

Two pairs of rotary shafts 15 one pair on each side of the inspection conveyor 2, are supported by the horizontal framework 5 in symmetrical relation to each other with respect to the center of the frame structure 4, and two pairs of centering rollers 17 are mounted on the respective pairs of the rotary shafts 15 through respective pairs of levers 16. Each pair of the rotary shafts 15 are operatively associated with each other by means of gears 18 rigidly mounted thereon and meshed to each other, while one of the rotary shafts 15 of one pair and that of the other pair are operatively coupled to a cylinder 19. Accordingly, it is clear that, by the operation of the cylinder 19, the centering rollers 17 work on the tire T, which has been fed onto the inspection conveyor 2, so as to locate the tire at a predetermined position above the inspection conveyor 2. It is to be noted that the inspection conveyor 2 is adapted to be driven by a motor 20.

Positioned above the inspection conveyor 2 and defining the predetermined position for the tire T on the conveyor 2 is a lower rim 22 supported by a cylinder 21, rigidly carried by the framework 4, for movement between raised or elevated and lowered positions. Another cylinder 23 rigidly mounted on the frame structure 5 carries an upper rim 24 in coaxial relation to and in face-to-face relation to the lower rim 22 for movement between raised and lowered positions away from and close towards the lower rim 22. The lower and upper rims 22 and 24 are cooperative to each other to sandwitch the tire T therebetween and then to lift the tire T upwardly from the inspection conveyor 2 and towards an inspection position.

Although not shown, the lower and upper rims 22 and 24 have respective inflators for supplying air into the tire T, sandwiched air-tightly therebetween, to inflate the tire T. The cylinder 23 carrying the upper rim 24 is operatively coupled to a motor 25, rigidly mounted on the top of the frame structure 4, for rotating the upper rim 24 and, hence, the tire, at a low speed in a horizontal plane perpendicular to the cylinders 21 and 23.

An upper portion of the frame structure 4 carries a cylinder 27 which in turn carries a removal pin 26 for disengaging the tire T, which has been engaged with the upper rim 24, from the upper rim 24, and also carries a marking device 30 for printing a marking on an area of the tire T where a defect, such as an excessive indent, has been detected. The marking device 30 can be adjusted to any one of a number of positions by turning an adjustment wheel 28 which is operatively coupled thereto through an endless belt or chain 29.

In correspondence with the tire T held between the upper and lower rims 24 and 22, there is provided a bracket 33, having an upper frame 38 rigidly secured thereto, and a guide shaft 34 having a lower frame 42 pivotally mounted thereon. The upper frame 38 supports an upper support frame 37 which is adjustably moved along a screw rod 36, adapted to be driven by and connected coaxially with a motor 35, in a direction up and down. On the other hand, the lower frame 42 supports a lower support frame 41 which is adjustably moved in a direction up and down along a screw rod 40 adapted to be driven by and connected coaxially with a motor 39. The guide shaft 34 is operatively coupled to a cylinder 43 so that a lower arm 47 of the lower support frame 41 can be pivoted towards a retracted position together with the lower frame 42.

Figure 3:
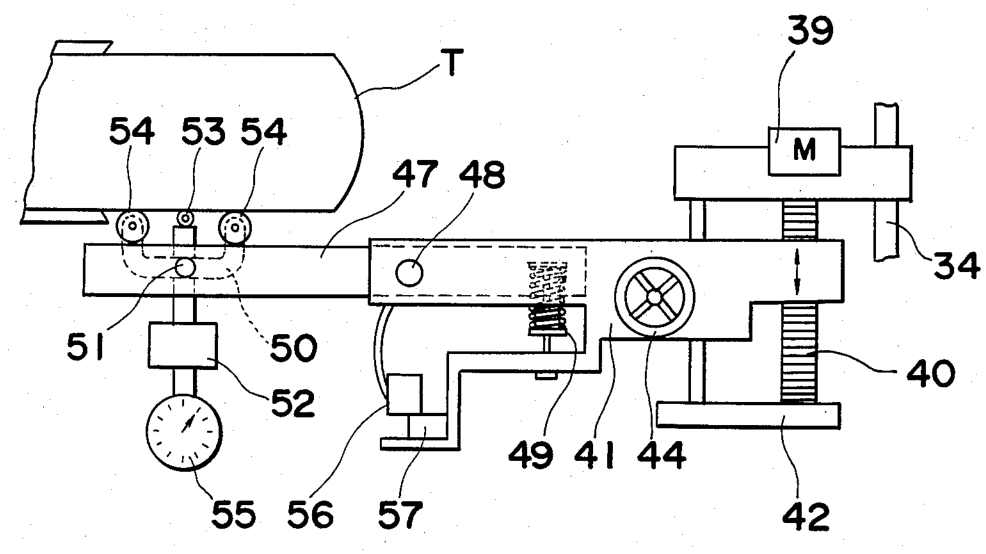
FIG. 3 is a front elevational view, on an enlarged scale, showing a lower detecting mechanism used in the apparatus.
Figure 4:
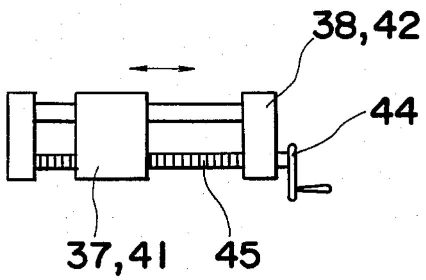
FIG. 4 is a side view of a lateral adjustment mechanism used in the apparatus.
Figure 5:
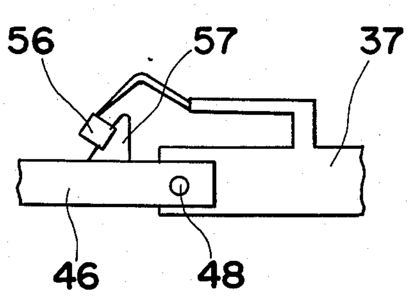
FIG. 5 is a front elevational view showing an upper frame and an upper arm, both used in the apparatus.

As shown also in FIGS. 3, 4 and 5, the upper and lower support frames 37 and 41 are finely adjustable in position in a lateral direction relative to the upper and lower frames 38 and 42 by means of a screw shaft 45 adjustable by an adjustment wheel 44.

The upper and lower support frames 37 and 41 carry respective arms 46 and 47 supported thereby for pivotal movement about respective connecting pins 48 in a plane perpendicular to the plane of rotation of the tire T and extending above and beneath the tire T then held between the upper and lower rims 24 and 22. The arms 46 and 47 are normally biased by respective springs 49 so as to pivot towards the tire T then held between the lower and upper rims 22 and 24, respectively, as best shown in FIG. 3.

Figure 6:
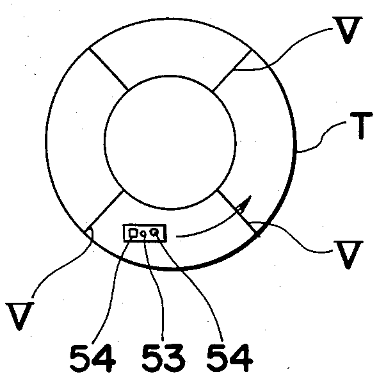
FIG. 6 is a plan view showing the relationship in position between a tire and the detecting mechanism shown in FIG. 3.

The free end portion of each of the arms 46 and 47 is forked to provide a respective pair of fingers between which a generally U-shaped carrier 50 is accommodated for pivotal movement about a bearing pin 51, the bearing pin 51 having its opposite ends journalled by the fingers of the respective arm 46 or 47 and a substantially intermediate portion extending through an intermediate point of the U-shaped carrier 50. The carrier 50 has a detecting roller 53 mounted on an intermediate portion thereof and normally biased by a spring element so as to contact a corresponding side wall of the tire. This detecting roller 53 is so supported that, when the roller 53 is shifted away from the tire T in contact with an indent on the corresponding side wall of the tire over a predetermined distance, i.e., when the detecting roller 53 defects the presence of an excessive indent on the corresponding side wall of the tire T, a microswitch 52 can be switched on to generate an electrical signal indicative of the presence of such excessive indent on the side wall of the tire T. The U-shaped carrier 50 on each of the arms 46 and 47 has contact rollers 54 rotatably mounted on respective ends thereof. It is to be noted that a calibrated gauge 55 may be employed for indicating the amount of shift of the detecting roller 53 relative to the tire T. The rollers 53 and 54 carried by each of the arms 46 and 47 through the respective carrier 50 are so arranged and so held in contact with the tire as to rotate as the tire T is rotated about the longitudinal axis of the cylinder 23 together with the rims 22 and 24 as shown in FIG. 6.

As best shown in FIGS. 3 and 5, each of the arms 46 and 47 has a respective sensor 56 carried thereby and operatively associated with a position detecting switch 57 which is mounted on the corresponding support frame 37 or 41.

The sensor 56 and the position detecting switch 57 are employed for the purpose of interrupting the associated motor 35 or 39 when the respective arm 46 or 47 is pivoted about the connecting pin 48 to a horizontal position against the respective spring 49.

While the apparatus is constructed as hereinbefore fully described, it operates in the following manner.

When the tire T is transported from the supply conveyor 1 onto the inspection conveyor 2, a photoelectric switch detects the arrival of the tire T onto the inspection conveyor 2 and causes the cylinder 19 to pivot the levers 16 so that the tire on the inspection conveyor 2 can be centered to locate at the predetermined position in coaxial relation with any one of the upper and lower rims 24 and 22. At the same time, the cylinder 10*a* is also operated to cause the stopper assembly 10 to assume the projected position to interrupt the supply of the next succeeding tire onto the supply conveyor 1.

After a predetermined period of time, i.e., upon completion of the centering of the tire on the inspection conveyor 2, the drive of the inspection conveyor 2 is interrupted.

Subsequently, by the operation of the cylinder 21, the lower rim 22 is moved towards the raised position and, during this movement, it supports the tire T from below. The movement of the lower rim 22 continues until the tire T so raised contacts the upper rim 24 with the lower and upper rims 22 and 24 engaged in the tire T from the opposite directions close to each other. At the same time with the arrival of the lower rim 22 at the lifted position, the inflators are operated to inflate the tire T to a predetermined internal pressure.

Thereafter, by the operation of the cylinder 43, the lower frame 42 is pivoted from the retracted position towards a detecting position at which the lower arm 47 is brought below the side wall of the tire and, then, the lower support frame 41 is elevated by the rotation of the screw rod 36 caused by the motor 35. This in turn causes the contact rollers 54 on the arm 50 carried by the lower arm 47 to contact the side wall of the tire T from below. As the lower support frame 41 is further elevated compressing the spring 49, the position detecting switch 57 is turned off by the sensor 56 to hold the lower arm 47 at the horizontal position. At this time, the rollers 53 and 54 are held under pressure in contact with the side wall of the tire T uniformly.

On the other hand, by the rotation of the motor 39, the upper support frame 37 is lowered to cause the rollers 54 on the arm 50, mounted on the upper arm 46, to contact the side wall of the tire T from above. As the lower support arm 37 is further lowered, compressing the spring 49, the sensor 56 switches the position detecting switch 57 off to bring the upper arm 47 to a halt at the horizontal position with the rollers 53 and 54 consequently held uniformly in contact under pressure with the surface of the side wall of the tire T.

The motor 25 is then energized to rotate the upper rim 24 and, hence, an assembly of the upper rim 24, the tire T and the lower rim 22 at a speed of, for example, 8 rpm. Detection of the indents on both side walls of the tire T can be initiated after the tire has undergone a few, for example, two or three, revolutions.

The microswitch 52 operatively associated with the detecting roller 53 is so designed and so adjusted as to generate the electrical signal indicative of the presence of the excessive indent on the tire T only when the detecting roller 53 is shifted a predetermined distance, for example, 0.5 mm, away from the surface of the side wall of the tire T in contact with the indent on the tire T.

After the inspection has been done in the manner as hereinabove described, air is exhausted from the tire T and, by the operation of the motor 35, the lower support frame 41 is lowered along the screw rod 36 with the rollers 53 and 54 on the lower arm 47 consequently separating away from the tire. When the lower support arm 41 arrives at the lowered position, the lower frame 42 is pivoted to the retracted position by the operation of the cylinder 43.

On the other hand, by the operation of the motor 39, the upper support frame 37 is elevated towards the raised position along the screw rod 40 with the rollers 53 and 54 on the upper arm 46 consequently separating away from the tire T.

Thereafter, the lower rim 22 is lowered by the operation of the cylinder 21 while the removal pin 26 is actuated by the operation of the cylinder 27 to disengage the tire from the upper rim 24, thereby allowing the tire T to fall by gravity onto the inspection conveyor 2. At the same time, the inspection conveyor 2 is driven to transport the tire T onto the delivery conveyor 3.

It is to be noted that, in the event that the microswitch 52 has generated the electrical signal indicative of the presence of at least one excessive indent on either one of the side walls of the tire T', the cylinder 11 is operated in response to the electrical signal to pivot the delivery conveyor 3 from the delivery position A to the eject position B to allow the defective tire T' to fall onto the collecting basket. Unless the electrical signal is generated from the microswitch 52, the delivery conveyor 3 is in the delivery position A thereby allowing the tire T, fed onto such conveyor 3, to be further transported onto the conveyor 12 and then towards the next processing station.

From the foregoing description, it has now become clear that, with the apparatus of the present invention so constructed and so operable as hereinbefore fully described, the inspection of the tires can be performed automatically, efficiently and accurately.

Although the present invention has fully been described in connection with the preferred embodiment thereof with reference to the accompanying drawings, it is to be noted that various changes and modifications are apparent to those skilled in the art. Such changes and modifications are, unless they depart from the true scope of the present invention, to be construed as included therein.

What is claimed is:

1. An apparatus for inspecting tires one at a time for detecting the presence of a defect on both side walls of the tire, which comprises, in combination:

supply, inspection and delivery conveyors arranged in line with each other with the inspection conveyor positioned between the supply and delivery conveyors, said delivery conveyor being supported for pivotal movement between a delivery position and an eject position;

means positioned above the inspection conveyor for centering the tire, which has been transferred onto the inspection conveyor from the supply conveyor, to allow the tire to assume a predetermined position;

a movable rim mechanism including a lower rim supported for movement between lowered and lifted positions, and an upper rim aligned coaxially with and in face-to-face relation to the lower rim, said tire at said predetermined position resting on the lower rim and adapted to be air-tightly sandwiched between the lower and upper rims when the lower rim is moved to the lifted position;

means coupled to the upper rim for rotating the tire together with the lower and upper rims in a horizontal plane perpendicular to the direction of movement of the lower rim;

a generally elongated lower carriage supported for movement in a direction parallel to the axis of rotation of the tire and also for pivotal movement in a plane parallel to said horizontal plane;

a generally elongated upper carriage supported for movement in a direction parallel to the axis of rotation of the tire and extending towards a position immediately above one of the opposite side walls of the tire;

a first sensing means mounted on the lower carriage, said first sensing means contacting under pressure the other of the opposite side wall surfaces of the tire when said lower carriage is moved close to the tire while pivoted to a position immediately below said other of the opposite side wall;

a second sensing means mounted on the upper carriage and adapted to contact said one of the opposite side walls of the tire when said upper carriage is lowered close to the tire; and means responsive to any one of the first and second sensing means for generating an electric signal indicative of the presence of at least one projecting indent on the respective side wall surface of the tire.

2. An apparatus as claimed in claim 1, wherein each of said first and second sensing means comprises a sensing roller mounted on the respective carriage for displacement in a direction perpendicular to the associated side wall of the tire, said sensing roller being operatively coupled to said signal generating means such that, when said sensing roller is displaced a distance greater than a predetermined value, said signal generating means generates said signal.

3. An apparatus as claimed in claim 1 or 2, wherein said signal generating means comprises a microswitch.

4. An apparatus as claimed in claim 1 or 2, wherein said delivery conveyor is adapted to be pivoted from the delivery position towards the eject position in response to the generation of the signal from the signal generating means.

* * * * *